US009909071B2

(12) United States Patent
Schuetzle et al.

(10) Patent No.: US 9,909,071 B2
(45) Date of Patent: *Mar. 6, 2018

(54) PROCESS FOR SMALL SCALE GAS TO LIQUID HYDROCARBON PRODUCTION THROUGH RECYCLING

(71) Applicant: Greyrock Energy, Inc., West Sacramento, CA (US)

(72) Inventors: Robert Schuetzle, Sacramento, CA (US); Dennis Schuetzle, Grass Valley, CA (US); Matthew Caldwell, West Sacramento, CA (US)

(73) Assignee: Greyrock Technology LLC, Sacramento, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/998,576

(22) Filed: Nov. 13, 2013

(65) Prior Publication Data

US 2015/0275097 A1    Oct. 1, 2015

(51) Int. Cl.
*C10G 2/00* (2006.01)
*C01B 3/36* (2006.01)
*C01B 3/38* (2006.01)

(52) U.S. Cl.
CPC .............. *C10G 2/32* (2013.01); *C01B 3/36* (2013.01); *C01B 3/386* (2013.01);
(Continued)

(58) Field of Classification Search
CPC .... C10G 2/32; C10G 2/00; C01B 2203/0405; C01B 2203/0255; C01B 2203/01;
(Continued)

(56) References Cited

U.S. PATENT DOCUMENTS 4,499,209 A    2/1985  Hoek et al.
5,620,670 A    4/1997  Benham et al.
(Continued)

FOREIGN PATENT DOCUMENTS

EP    0220933    *  5/1987

OTHER PUBLICATIONS

Totten, George E. Westbrook, Steven R. Shah, Rajesh J. (2003). Fuels and Lubricants Handbook—Technology, Properties, Performance, and Testing: (MNL 37WCD), Chapter 5: Automotive Diesel and Non-Aviation Gas Turbine Fuels, p. 115-144.*
(Continued)

*Primary Examiner* — Rosalynd A Keys
*Assistant Examiner* — Amy C Bonaparte
(74) *Attorney, Agent, or Firm* — Jeffrey A. McKinney; McKinney Law Group APC (57) ABSTRACT

The disclosed embodiments relate to a process ideal for small scale (distributed) gas to liquids production by recycling and processing some side (non-targeted) products. During operation, the system produces a range of hydrocarbon outputs. The disclosed embodiments recycle non-targeted outputs to maximize the output of targeted hydrocarbon products. Recycled outputs include waxes, light gases and syngas. These embodiments allow for, but are not limited to, the efficient production of high cetane diesel fuel through the recycling of long-chain hydrocarbon wax and short-chain light. Process efficiency is further increased through the recycling of tail-gas produced from catalytic reactions.

18 Claims, 4 Drawing Sheets

SAMPLE PRODUCTION ENVIRONMENT
100

(52) U.S. Cl.
CPC ........... *C01B 2203/0255* (2013.01); *C01B 2203/0261* (2013.01); *C01B 2203/0283* (2013.01); *C01B 2203/043* (2013.01); *C01B 2203/0405* (2013.01); *C01B 2203/062* (2013.01); *C01B 2203/1241* (2013.01); *C01B 2203/141* (2013.01); *C01B 2203/148* (2013.01); *C10G 2400/04* (2013.01)

(58) Field of Classification Search
CPC ..... C01B 3/36; C01B 3/386; C01B 2203/062; C01B 2203/0261; C01B 2203/141; C01B 2203/043; C01B 2203/148; C01B 2203/0283; C01B 2203/1241
USPC .......................................................... 518/703
See application file for complete search history.

(56) References Cited

U.S. PATENT DOCUMENTS

| | | | | |
|---|---|---|---|---|
| 6,262,131 | B1 | 7/2001 | Arcuri et al. | |
| 7,404,936 | B2 | 7/2008 | Mazanec et al. | |
| 8,394,862 | B1* | 3/2013 | Schuetzle | C10G 2/332 |
| | | | | 518/700 |
| 2002/0120017 | A1* | 8/2002 | Bohn et al. | 518/703 |
| 2003/0192235 | A1* | 10/2003 | French | 44/572 |
| 2005/0145540 | A1 | 7/2005 | O'Rear | |
| 2007/0237710 | A1* | 10/2007 | Genkin et al. | 423/651 |
| 2007/0249738 | A1 | 10/2007 | Haynes et al. | |
| 2009/0111900 | A1* | 4/2009 | Ayasse | B01J 23/8896 |
| | | | | 518/715 |
| 2009/0124713 | A1* | 5/2009 | Ayasse | B01J 23/8896 |
| | | | | 518/715 |
| 2011/0142722 | A1* | 6/2011 | Hemmings et al. | 422/149 |
| 2012/0161451 | A1 | 6/2012 | Struble et al. | |
| 2012/0208902 | A1* | 8/2012 | Kresnyak et al. | 518/702 |
| 2012/0326091 | A1 | 12/2012 | Laquaniello | |
| 2013/0065974 | A1 | 3/2013 | Kresnyak | |
| 2013/0154278 | A1 | 6/2013 | Abughazaleh | |
| 2013/0217792 | A1 | 8/2013 | Schuetzle et al. | |

OTHER PUBLICATIONS

IGU (International Gas Union (IGU) Natural Gas Conversion Guide, p. 1-52, 2012).*
Boll ("Gas Production, 3. Gas Treating" Ullmann's Encyclopedia of Industrial Chemistry, published online Oct. 15, 2011, DOI: 10.1002/14356007.o12_002, p. 483-539).*
Borg (Fischer-Tropsch synthesis over gamma-alumina supported cobalt catalysts: Effect of support variables, Journal of Catalysis, 248, 2007, p. 89-100).*
Fedou, et al., "Conversion of Syngas to Diesel," Petr. Tech. Q. vol. 13, No. 3, pp. 87-91 (2008).
Sie, et al., "Conversion of Natural Gas to Transportation Fuels via SMDS," Cat. Today, vol. 8, pp. 371-394 (1991).

* cited by examiner

PROCESS FOR SMALL SCALE GAS TO LIQUID HYDROCARBON PRODUCTION THROUGH RECYCLING

BACKGROUND

Field of the Invention

The disclosed embodiments generally relate to a process for recycling byproducts from a unique gas to liquids process, including wax, light hydrocarbons and syngas, to improve production efficiencies and enable utilization of the technology at a scale smaller than has been previously practiced in industry. More specifically, the disclosed embodiments relate to processes by which catalytic processing may convert natural gas, natural gas liquids, or other hydrocarbon feedstocks into economically valuable hydrocarbon products more efficiently than traditional gas to liquids, or GTL, techniques.

The best known GTL technique is the Fischer-Tropsch (F-T) catalytic process which has developed significantly since the original inventors filed their patents in the 1920's. Today, several large F-T processing plants are in production throughout the world, converting natural gas, coal and other fossil feedstocks into more valuable hydrocarbon products. These plants include Sasol 1 (Sasolburg, South Africa), Sasol Synfuels East & West (Secunda, South Africa), PetroSA (Mossel Bay, South Africa), Shell Middle Distillate Synthesis (Bintulu, Malayasia) and Oryx GTL (Ras Laffan, Qatar). Each of these plants employs different technologies, in many cases with substantial differences. However, one commonality of these plants is that their component technologies make them uneconomical for smaller, more distributed operation. As the investment required for these traditional F-T processing plants costs billions of dollars per installation, these traditional technologies are not economically viable for the deployment of distributed plants. Many billions of dollars worth of natural gas and related products are currently flared or otherwise remain stranded at gas production fields and shale oil operations around the world for lack of appropriate means to convert those hydrocarbons on-site into market viable products.

As global populations continue to develop economically and the demand for energy increases, there will be an ever greater need for new supplies of refined hydrocarbons fuels. In particular, the demand for clean, low sulfur-content, high lubricity, high cetane diesel fuel will increase. While traditional F-T processing will help fill some of the demand, the high up-front investment required by such plants means that they will only be constructed in areas where there are significant quantities of feedstocks that are either freely available or have negative market value (i.e., there is a market value to discarding the feedstocks). A substantial increase in the efficiency and effectiveness of gas to liquids processing at smaller scale can unlock vast stockpiles of energy for world markets.

Related Art

It is known in the art that natural gas or other feedstocks (e.g., natural gas liquids, waste $CO_2$, biomass, associated stranded or flared gas and combinations thereof) can be converted into syngas (herein defined as a mixture comprising primarily hydrogen and carbon monoxide with smaller quantities of other products, including methane, carbon dioxide, argon and nitrogen) by a variety of known thermochemical conversion methods. These methods include partial oxidation, auto-thermal reforming, steam methane reforming, gasification, thy reforming and other known methods. As this is an active area for research and development, technologies for syngas production systems from other carbonaceous resources are also widely known and emerging processes are under development.

The catalytic hydrogenation of carbon monoxide to produce light gases, liquids and waxes, ranging from methane to heavy hydrocarbons ($C_{100}$ or higher) in addition to oxygenated hydrocarbons is typically referred to as Fischer-Tropsch (F-T) synthesis. Traditional F-T processes primarily produce a wax ($C_{25}$ to $C_{100}$ or greater) from a catalytic conversion process. This wax is then hydrocracked and/or further processed to produce diesel fuel, naphtha and other fractions. During the hydrocracking process, light hydrocarbons are also produced, which may require additional upgrading to produce viable products. Some of these processes are known and described in the art.

For example, US Patent Application Publication US2013/0065974 A1, filed Sep. 8, 2011, describes a process in which naphtha is recycled as a feedstock to a syngas generator in a Fischer-Tropsch process.

U.S. Pat. No. 6,262,131 81 (Syntroleum), issued Jul. 17, 2001, describes a structured Fischer-Tropsch catalyst system and method to primarily produce heavy hydrocarbons ($C_{25}$+) that includes at least one structure having a catalytic surface, such catalytic surface having a linear dimension exceeding 20 mm, a void ratio exceeding 0.6, and a contour that causes non-Taylor flow when CO and $H_2$ pass through the structure. F-T catalysts, including iron and cobalt, are described in the patent.

U.S. Pat. No. 7,404,936 (Velocys, Inc.) issued Jul. 29, 2008, describes a micro-channel reactor system and catalysts used in the micro-channel reactor system to produce heavy hydrocarbons from a syngas steam.

U.S. Pat. No. 4,499,209 (Shell Oil Company), issued Feb. 12, 1985, describes a Fischer-Tropsch catalyst prepared by impregnation of a silica carrier with a solution of zirconium and titanium, followed by calcination and other preparation steps.

U.S. Pat. No. 5,620,670 (Rentech, Inc.), issued Apr. 15, 1997, describes a catalytic process for converting hydrogen and carbon monoxide to heavy hydrocarbons (waxes) in a Fischer-Tropsch synthesis reactor using a promoted iron oxide catalyst slurry.

All of the aforementioned processes produce primarily a hydrocarbon wax that requires processing to create economically viable products. These techniques, such as hydrocracking and other upgrading means, add significant expense and complexity to a plant design. Such relatively expensive processes can be justified for large implementations such as the traditional gas to liquid installations listed above. However, for smaller, distributed plants that require lower volume of feedstock for gas-to-liquids (GTL) synthesis and other plants that produce less than approximately 25,000 barrels per day, traditional F-T plant designs that incorporate hydrocracking and other expensive upgrading processes are generally not economically viable. Any means by which such smaller, distributed plants might be constructed might substantially improve energy production worldwide.

SUMMARY

The disclosed embodiments relate to catalytic processes that permit recycling of some product streams in a GTL system. Normally, traditional GTL systems are unable to effectively recycle their output products. In particular, as such systems predominantly output non-economically viable, long-chain hydrocarbon wax, recycling is not generally an option. However, as with some of the disclosed embodiments, when a novel catalyst is capable of producing diesel fuel as a majority product and wax as a minority product, it becomes possible to efficiently recycle non-target outputs.

A traditional GTL synthesis process combines three steps. The first element of any GTL process is to convert primary hydrocarbon feedstocks into a syngas through one of several methods (e.g., catalytic steam methane reforming (SMR), two-step reforming, auto-thermal reforming (ATR), heat exchange reforming, partial oxidation (PDX), gasification, and several new systems under development). Such syngas is composed primarily of carbon monoxide and hydrogen. In the second step, a catalytic reactor processes the newly created syngas and outputs a mix of hydrocarbons ($C_1$ to $C_{100+}$). With traditional F-T processing, the majority of the output is an F-T wax (herein defined as $C_{25}$ or greater that is produced in a Fischer-Tropsch process). These waxes require a third step (e.g., hydrocracking) before producing economically viable products.

Some embodiments of the invention provide a GTL system that permits recycling of wax and other by-products to the syngas production phase. These embodiments utilize a catalytic reactor with an efficient supported catalyst for direct conversion of syngas into diesel fuel and other byproducts. Using such a catalyst, the reactor produces a stream of hydrocarbons in which the volume of diesel fuel is substantially greater than the volume of wax. This catalytic process produces diesel fuel products that either can be used directly as neat fuel or can be blended with petroleum-based fuels to improve cetane content, reduce priority pollutant emissions, improve fuel lubricity and/or decrease engine wear. Further, this disclosed catalyst and catalytic reactor allows for production at low pressures (e.g., below about 450 psi). Essentially, due to the small volume of wax and light hydrocarbons produced and the efficiency of the catalyst in primarily producing diesel fuel the recycling of the wax and/or light hydrocarbons becomes viable. The resulting system is one that intakes primary hydrocarbon feedstocks (e.g., natural gas, natural gas liquids, coal, biomass, coal, petroleum coke, or other feedstocks) and outputs diesel fuel, water and few other products by virtue of the recycling step.

"Diesel fuel" herein is defined as hydrocarbons produced from the process that meet ASTM or other international diesel fuel specifications either as a neat fuel or as a blend with traditional diesel fuel, biodiesel, or other diesel fuels. "Wax" herein is defined as hydrocarbons heavier than diesel fuel. "Light hydrocarbons" are defined as hydrocarbons lighter than diesel fuel.

Traditional GTL catalytic reactor systems are unsuitable for recycling the hydrocarbons they create. Such reactors output mostly waxes with little or no directly produced fuel products, such as diesel fuel. In order to output diesel fuel, traditional GTL processes generally must subject their output wax to hydrocracking or other cost-intensive upgrading techniques. Any attempt at recycling these waxes back through the syngas production phase would be inefficient and counterproductive.

A variety of catalyst parameters of the supported catalyst allow for efficient operations at low pressures. Structural parameters include support material (e.g., $Al_2O_3$, $SiO_2$, activated carbon, carbon nanotubes and zeolites), size, shape (cylinder, tri-lobe, etc.), pore diameter, surface area, crush strength, effective pellet radius and other parameters as described herein. Procedures for the reduction of the catalyst and the type of reactor used in the process are also important factors that determine the selectivity of the product.

As shown through performance tests, variations on the parameters mentioned above can have a dramatic effect on product distribution in some embodiments. For example, finding the optimal catalyst properties can change the product distribution and can make a difference between an economically viable, distributed plant (producing less than 25,000 barrels of diesel fuel product per day) and one that requires expensive upgrading processes. Further, the reduction procedures and type of reactor used in the process are integral to obtaining the desired yields. Examples of efficient catalyst parameters and reduction procedures are given below.

Some embodiments of the invention utilize a partial oxidation (PDX) system to convert feedstocks and recycled material to syngas. The partial oxidation system may be catalytic, non-catalytic or other methods may be utilized to economically convert the feedstocks into syngas. These systems utilize air, oxygen, or enhanced air (defined herein as a substance that has an oxygen volume greater than air but below that of pure oxygen) in the thermochemical conversion process to produce syngas.

Some embodiments recycle both the wax products and/or light hydrocarbons to the syngas production process.

Some embodiments recycle the wax products to the syngas production unit by injecting the wax into a separate chamber or system separately from the natural gas and other gas feedstocks. This separate chamber or system may be a pre-reformer, gasifier, thermal reformer, partial oxidation unit with its own burner, or other conversion system to separately convert the wax into syngas.

Some embodiments recycle the wax to the same system used to convert the natural gas and other gas feedstocks.

Some embodiments produce a diesel fuel sufficiently refined to meet industry standard fuel testing specifications, such as provided by the ASTM D6079 fuel lubricity test and other ASTM tests.

In addition to re-processing wax and/or light hydrocarbons, some embodiments of the disclosures involve unique methods for augmenting the hydrogen to carbon monoxide ratio of the syngas. Virtually all GTL catalytic reactors require a particular ratio of carbon monoxide to hydrogen for efficient processing. For instance, some systems operate most efficiently when ratios of $H_2$:CO are approximately 1.7 to 2.2. Some disclosed embodiments involve augmenting the hydrogen stream in the GTL system by taking a volume of the syngas after the catalytic reactor and performing water gas shift and pressure swing absorption on the stream in order to increase the hydrogen to carbon monoxide ratio and cut down on inert gases in the overall syngas volume. Placing this step after the catalytic reactors enables the system to attain efficient hydrogen and carbon monoxide ratio control as well as control inert levels in the reactor.

DETAILED DESCRIPTION

The following description is presented to enable any person skilled in the art to make and use the process described, and is provided in the context of a particular application and its requirements. Various modifications to the disclosed embodiments will be readily apparent to those skilled in the art, and the general principles defined herein may be applied to other embodiments and applications without departing from the spirit and scope of the present disclosures. Examples that are listed are for illustration purposes and are not to limit the scope of the embodiments or the disclosures. Thus, the disclosures are not limited to the embodiments shown, but are to be accorded the widest scope consistent with the principles and features disclosed herein.

Overview

The disclosed embodiments introduce recycling as part of a GTL process. Some disclosed embodiments describe a catalytic process for conversion of syngas into diesel fuel. These embodiments do not require a final stage in which wax is hydrocracked or otherwise upgraded to create economically viable products. Instead, the end product of the catalytic process is mostly commercially viable diesel fuel, with a small leftover product mix of light hydrocarbons and wax. Further, since the quantities of the light hydrocarbons and wax are relatively small, they may be effectively recycled by resubmitting them to a syngas generation unit either simultaneously with the primary feedstocks or in series with another separate syngas generation unit or chamber. Traditional, large GTL processing plants are generally unable to recycle in this fashion, as their primary output is wax destined for hydrocracking or other wax upgrading process.

In addition to the ability to recycle its own non-market viable product, some disclosed embodiments operate at less severe operating conditions than established GTL processing plants. For this reason smaller installations are possible, allowing firms to site such plants in more numerous production environments (e.g. distributed plants) that are uneconomical for traditional GTL process installations (e.g., remote oil production facilities, shale gas locations, and others).

Production Environment, Wax and Light Hydrocarbon Recycling

Figure 1:
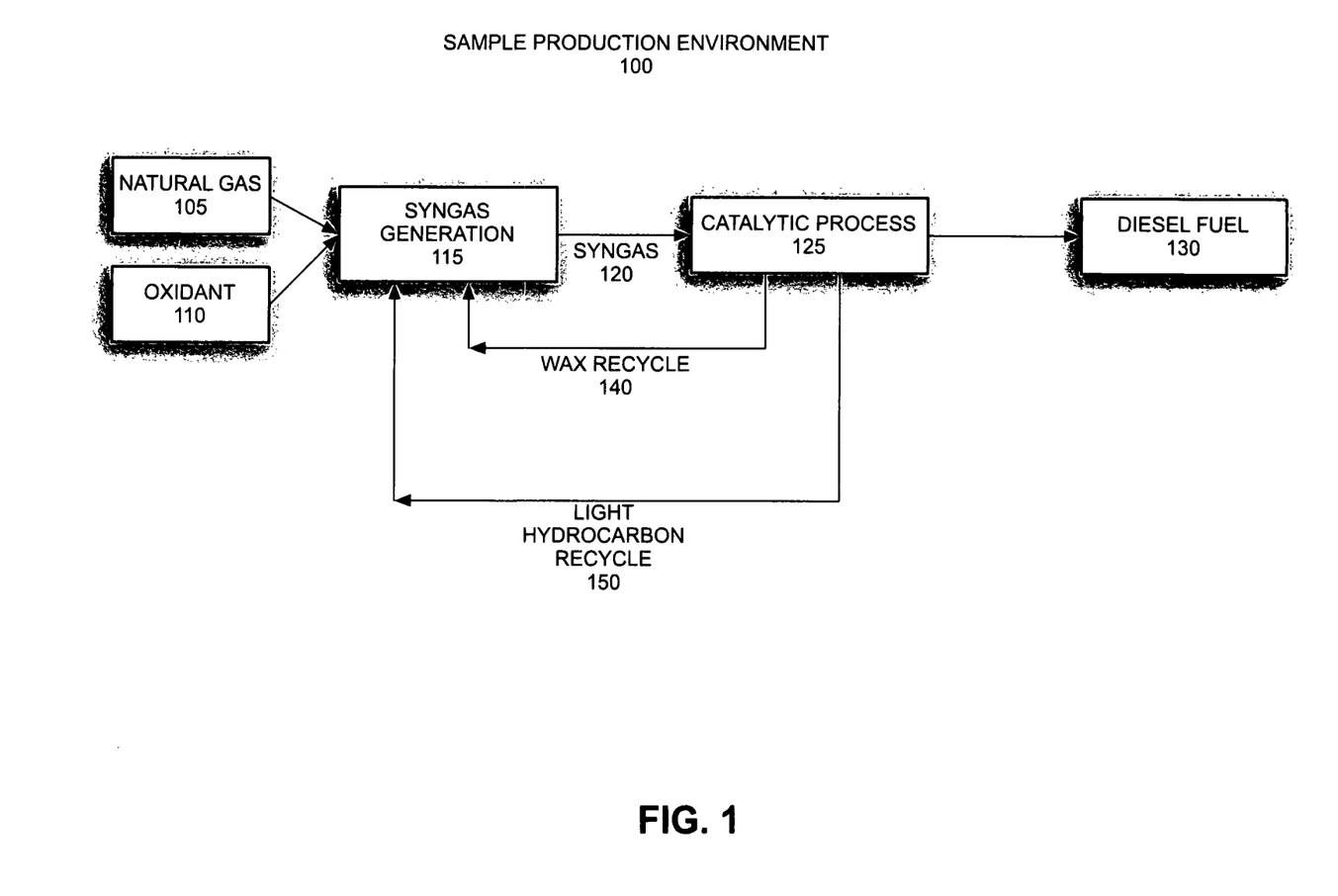
FIG. 1 illustrates a diesel fuel production process in accordance with the disclosed embodiments.

FIG. 1 illustrates a diesel fuel production process in accordance with the disclosed embodiments. Some disclosed embodiments convert primary feed gases directly into usable diesel fuel products. Conversely, typical GTL processes combine three steps: 1) thermochemical conversion of primary feed gases, liquids or solids into an intermediate feedstock (e.g., syngas), 2) catalytic reaction of the intermediate feedstock into a range of heavy hydrocarbons, primarily $C_{25}$ and higher (wax), and 3) hydrocracking of the wax to produce diesel, naphtha and other fractions. Some disclosed embodiments allow the process to complete with only the first two steps, dispensing with the hydrocracking required by traditional processes.

In most GTL processes, the primary feedstocks are typically low value hydrocarbons (e.g., coal, petroleum coke, natural gas, natural gas liquids and biomass). In some of the disclosed embodiments, natural gas 105 is used as a hydrocarbon feedstock. Typically, natural gas is primarily composed of methane.

The process combines this primary feedstock with an oxidant 110. Viable oxidants are oxygen in either pure or mixed forms (when partial oxidation approaches are used). In the embodiments of the invention, the oxidants may be pure oxygen, enriched air or natural air. When steam reforming approaches are used, oxygen is not needed and water is used as an input for the reformation.

A syngas generator inputs both the primary feedstock and the oxidant. Syngas generation 115 may be accomplished through a number of methods (e.g., catalytic steam methane reforming (SMR), thermal reforming, gasification, two-step reforming, auto-thermal reforming (ATR), heat exchange reforming, catalytic partial oxidation (PDX) and non-catalytic partial oxidation). In some embodiments, the disclosure uses non-catalytic partial oxidation to transform feedstocks to syngas 120.

To create the syngas in a partial oxidation system, an oxidizer is needed. In a disclosed embodiment, oxidation materials that might be used include oxygen, air or enriched air. The differences between these lies in their cost: air is free, while purifying oxygen or enriching air requires an investment in power and equipment. However, while air is free, it contains a lower percentage of oxygen and, consequently, is a less effective oxidizer that further introduces inert gases into the system (e.g., nitrogen and argon), consequently affecting efficiency. Various means of partial oxidation are possible (e.g., catalytic partial oxidation and non-catalytic or thermal partial oxidation). In a preferred embodiment, the process uses non-catalytic partial oxidation to create a syngas stream.

After creating syngas, some embodiments transfer the syngas to a catalytic process 125. Since engineers first developed the Fischer Tropsch process in the 1920's, numerous variations have been created. These processes are differentiated from one another by two primary factors: reactor type and catalyst. The primary reactor types in use today include slurry reactors, circulating fluid bed reactors, slurry bubble column reactors, two phase fluidized bed reactors, micro-channel reactors and fixed bed/multi-tubular reactors. Within the reactors, the GTL process requires a catalyst. The four major catalyst types are iron, cobalt, nickel and ruthenium. Most production plants primarily utilize iron, nickel and/or cobalt. Other elements are used as promoters include palladium, platinum, gold, nickel, rhenium, ruthenium, iridium, silver, osmium, lanthanum, cerium and rhodium. Finally, catalysts are further differentiated by their physical form and support structure. Such parameters include support material (e.g., $Al_2O_3$, $SiO_2$, activated carbon, carbon nanotubes and zeolites), size, shape (e.g., microspherical, cylindrical, tri-lobed, quad-lobed, multi-lobed, with lobed variations being either symmetrically or asymmetrically constructed), pore diameter, surface area, crush strength, effective pellet radius, and other parameters. In one disclosed embodiment, the process utilizes a tri-lobed catalyst. In another embodiment of the process a quad-lobed catalyst is utilized that is composed of greater than 5 weight percent cobalt, iron, nickel or a combination of these metals on gamma alumina, silica, or another support material along with one or more promoters at about 0.01 weight percent to about 2 weight percent based on the total weight of the supported catalyst.

GTL processes convert the syngas to a range of sulfur-free, long-chain hydrocarbons. Typical outputs include linear paraffins, olefins, α-olefins, oxygenates and water. Some of these outputs may be characterized as high cetane diesel fuels 130, either neat fuels suitable for immediate use or suitable for blending purposes with traditional petroleum products. One disclosed embodiment produces a high percentage of total products in the diesel fuel range, with a greater total volume of diesel fuel produced than volume of wax. Further, the resulting diesel fuel has a cetane value greater than 65 and a lubricity value ranging from 200 micron to 475 micron per ASTM D6079 and has been further certified for direct use by major truck manufacturers.

As a consequence of the high final product to wax ratio of the disclosed embodiments, it becomes possible to recycle wax and light hydrocarbon products within the system. Most traditional low temperature F-T processes produce an F-T wax as the primary product. A necessary third step is required (e.g., hydrocracking and wax upgrading) to produce value-added hydrocarbon products (e.g., diesel fuel and natural gas liquids). As hydrocracking and other upgrading techniques are energy intensive and expensive, they are most suitable for large-scale plants outputting greater than 25,000 barrels fuel per day. In the disclosed embodiments, the GTL process produces a relatively small amount of wax. This small amount of wax may be recycled 140 and mixed with the primary feedstock for conversion to syngas. Further, the process may also recycle 150 light hydrocarbons produced in the GTL process. By recycling most of the non-diesel fuel hydrocarbon by-products, the disclosed embodiments create a highly efficient process by which primary feedstocks are converted to diesel fuel in a system that has a low capital cost and an efficiency that is able to provide for smaller scale gas to liquids systems than have previously been achieved.

Production Environment, Hydrogen Supplementation

Efficient catalytic processing for the production of hydrocarbons from syngas requires a particular molar ratio of hydrogen to carbon monoxide. These concentration ratios vary depending on the catalyst used in the process. For instance, cobalt-based catalysts optimally function at a 1.7 to 2.2 $H_2$:CO ratio. Iron-based catalysts promote the water gas shift reaction and are thus able to tolerate lower ratios. Traditional F-T processes promote hydrogen either in parallel to syngas generation or after syngas generation but in most cases prior to the catalytic reaction.

Figure 2:
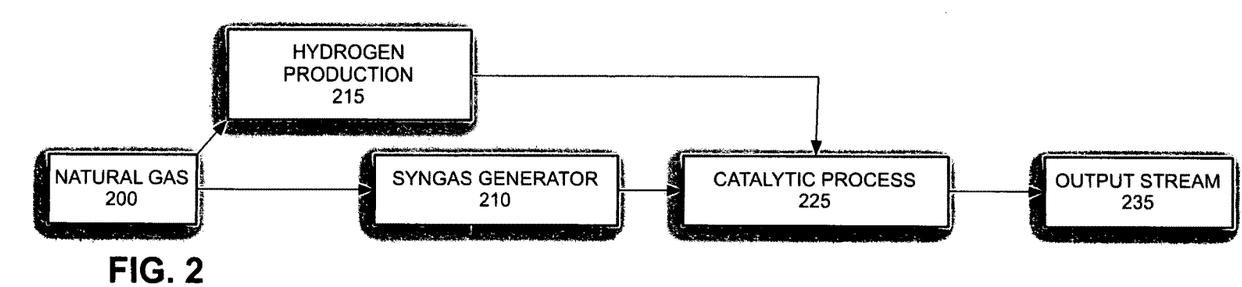
FIG. 2 illustrates a traditional GTL procedure in which a hydrogen production process adjusts $H_2$:CO ratios in parallel with syngas generation.

FIG. 2 illustrates a procedure in which a hydrogen production process adjusts $H_2$:CO ratios in parallel with syngas generation. In this case, natural gas 200 is input to both hydrogen production 215 (e.g., water gas shift reaction process) and a syngas generator 210. Note that feedstocks for the syngas generator and hydrogen production are not limited to natural gas, but can be other low value hydrocarbons (e.g., biomass, coal, petroleum coke). After both processes are complete, a traditional process might then input the syngas and hydrogen into the catalytic process 225 in an optimal ratio, producing an output stream 235 (e.g., light hydrocarbons, diesel fuel and wax).

Figure 3:
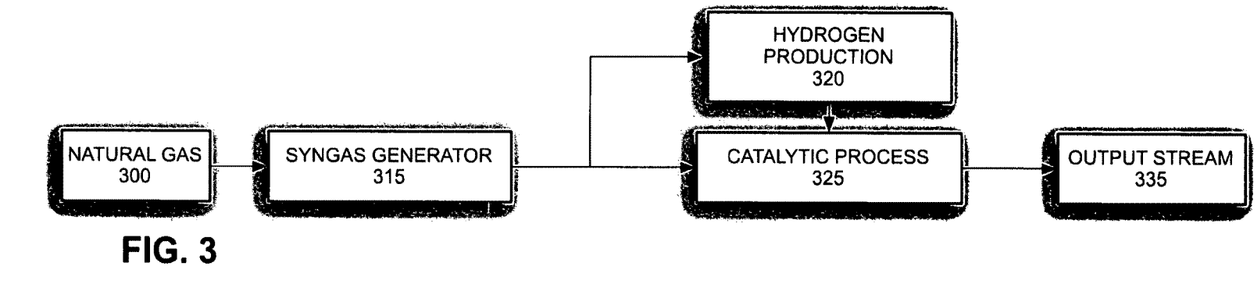
FIG. 3 illustrates a traditional GTL procedure in which a hydrogen production process adjusts $H_2$:CO ratios using the output syngas prior to the catalytic process.

Similarly, FIG. 3 illustrates a traditional procedure in which a hydrogen production process uses syngas to adjust $H_2$:CO ratios prior to the catalytic process. In this case, the syngas generator 315 takes all of the input natural gas 300 or other low value hydrocarbon. After the syngas is generated, the system delivers a portion of the syngas to a hydrogen production system 320. Once the system has generated an optimal ratio of hydrogen, the catalytic process 325 takes the feedstocks and converts them into an output stream of hydrocarbons 335. In both FIG. 2 and FIG. 3, the system determines the optimal ratio of hydrogen to carbon monoxide prior to the catalytic reaction.

Figure 4:
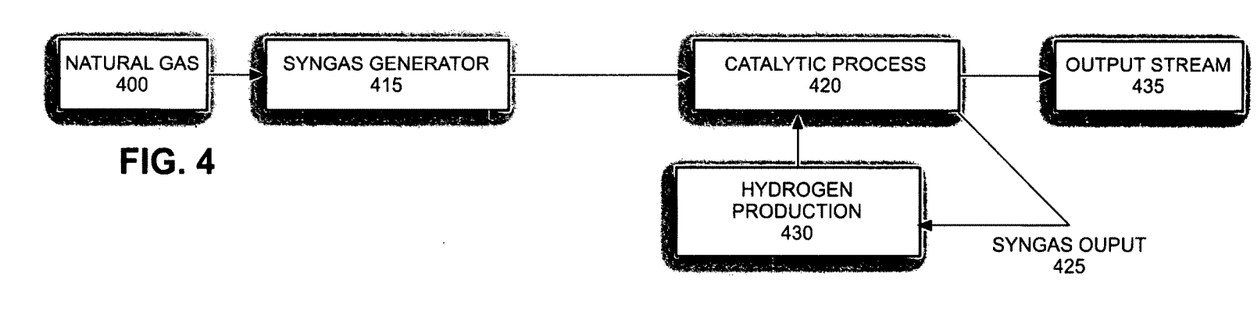
FIG. 4 shows an embodiment of the disclosures in which initial ratios of $H_2$:CO are not optimized prior to the GTL catalytic process, but rather recycle unspent syngas for hydrogen production providing better efficiency.

FIG. 4 shows an embodiment of the disclosures in which initial ratios of $H_2$:CO are not optimized prior to the catalytic process, but rather after the catalytic reaction by utilizing unspent syngas for hydrogen production and providing increased efficiency. In these embodiments, the syngas generator 415 takes the natural gas 400 or other low value hydrocarbon products directly. Afterwards, the catalytic reactor 420 converts the syngas into an output stream 435 without prior hydrogen generation. A hydrogen generator takes a portion of the syngas after the reactor at this point 425 and uses it to produce hydrogen using water gas shift and a pressure swing absorption bed, membrane or any other viable method. The resulting hydrogen is sent to the reactor and blended with the syngas stream. Utilization of this process is an effective and economical way to optimize $H_2$:CO ratios as well as controlling inert levels in the reactor.

Outputs

Figure 5:
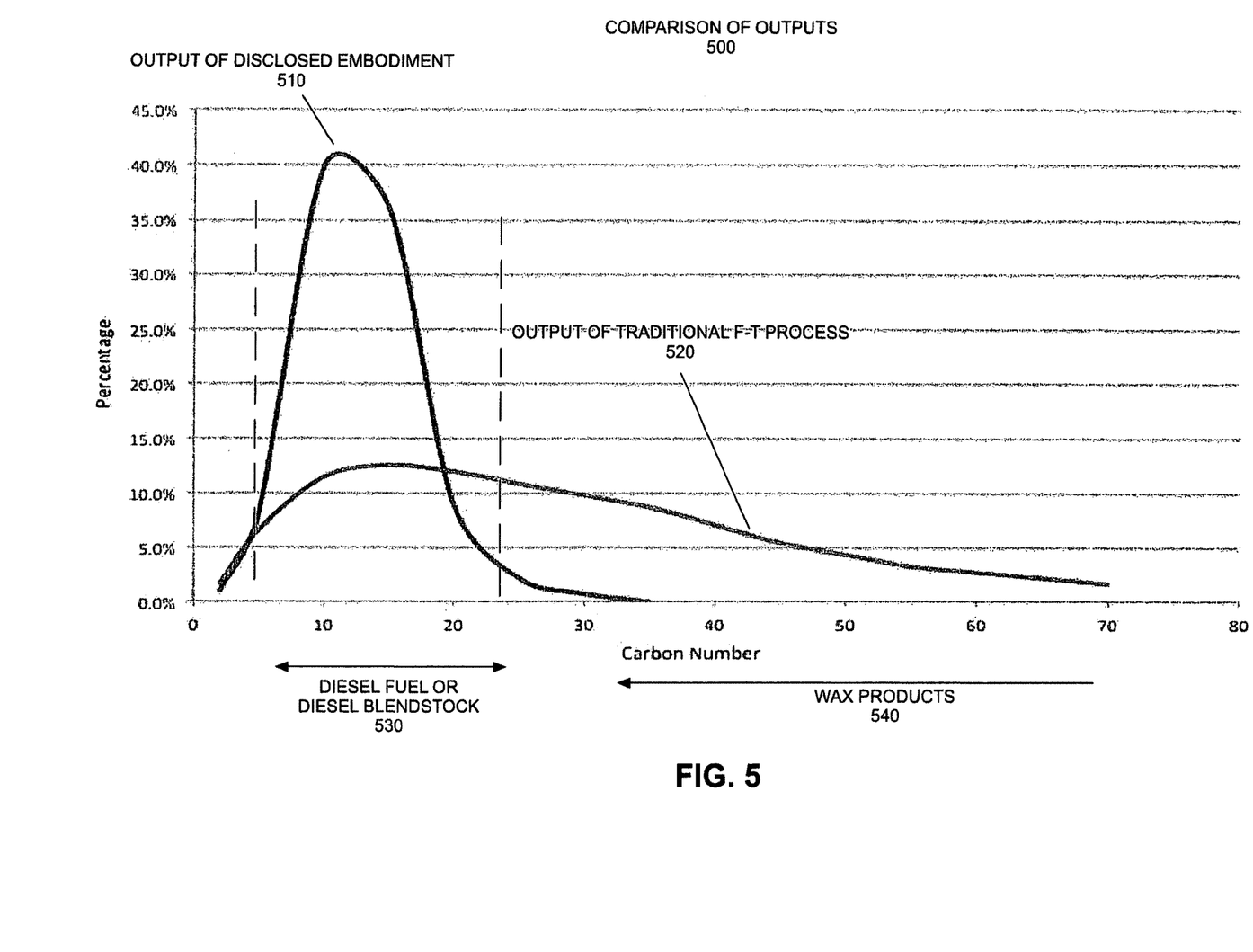
FIG. 5 presents a data comparison between the outputs of established F-T processes and the outputs of the disclosed embodiments.

FIG. 5 presents a data comparison between the outputs of established F-T processes and the outputs of some disclosed embodiments. The comparison of outputs 500 shows weight percentages of output versus the carbon number of the output hydrocarbons from the GTL processes. In particular, the figure shows the relatively high concentration of $C_8$ to $C_{24}$ product distribution 510 by some disclosed embodiments. This data depicts the distribution measured from one embodiment with a catalyst operating at 410° F., here compared with the product of a traditional F-T process 520.

Hydrocarbon chain length is linked to the commercial viability of the output products. Shorter hydrocarbon chains, from $C_8$ to $C_{24}$ predominately in the form of paraffins, are suitable for use as a neat diesel fuel or diesel blendstock 530. Traditional F-T processes produce a greater percentage of F-T wax 540, which require additional processing before producing economically viable products. As some of the disclosed embodiments produce relatively small quantities of wax, the wax may be recycled as a primary feedstock, thus allowing more of the initial feedstock hydrocarbons to be converted to commercially valuable diesel fuel.

GTL Processing Catalyst

Figure 6:
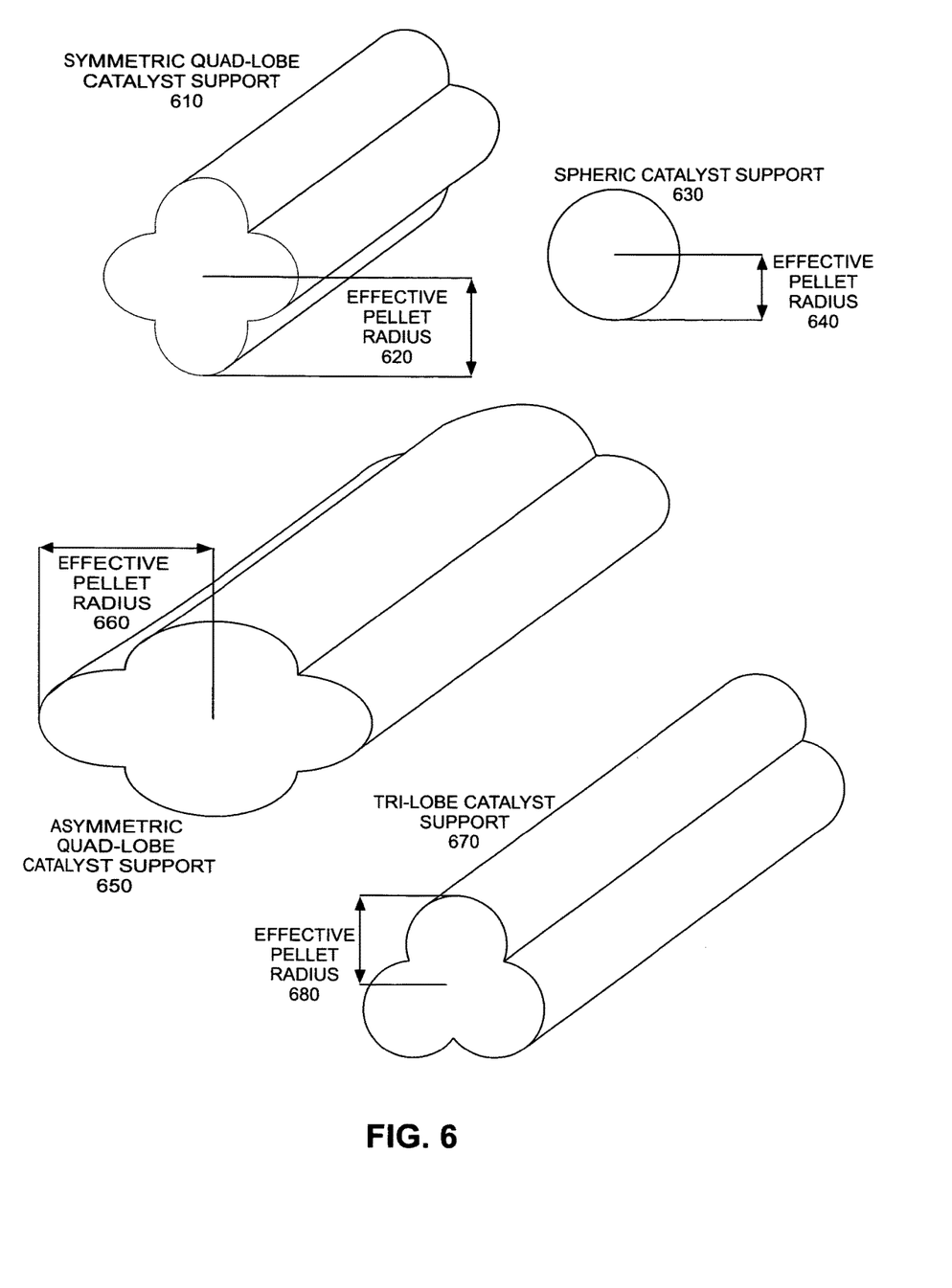
FIG. 6 illustrates three variations of catalyst support configuration in accordance with the disclosed embodiments.

FIG. 6 illustrates four variations of catalyst support configuration in accordance with some disclosed embodiments. These geometries support the GTL process: a symmetric quad-lobed catalyst support 610, a spheric catalyst support 630, an asymmetric quad-lobed support 650 and a tri-lobed support 670. Support materials in other shapes may also be used (e.g., granules and cylinders).

The catalyst shape is ideally an extrudate with a lobed, fluted or vaned cross section but could also be a sphere, granule, powder or other support shape for efficient operation. The use of a lobed structure, for example, enables a significant increase in the ratio of area to volume in the catalytic reactor system. The lobed structures also provide an improved pressure drop, which translates into a lower difference in the pressure upstream and downstream in the catalyst bed, especially when they are used in a fixed bed reactor.

FIG. 6 also illustrates how the effective pellet ratios of a support material are defined. The effective pellet radius of a pellet or support refers to the maximum distance from the mid-point of the support to the surface of the support. For lobed supports, the effective pellet radius refers to the distance between the mid-point and the outer surface portion of the pellet, here depicted for symmetric lobed supports 620, asymmetric lobed ones 660 and the tri-lobed supports

680. The effective pellet radius of the spherical support is noted in 640. In some embodiments of the disclosure, the effective pellet radius may be about 600 microns or less. In at least one embodiment of the disclosure, the effective pellet radius may be about 300 microns or less.

In some embodiments of the disclosure, the pellet or support material may be porous. The mean pore diameter of the support material may be greater than 80 angstroms. In at least one embodiment, the pellet or support material may have a mean pore diameter greater than 100 angstroms. In at least one other embodiment, the pellet or support material may have a mean pore diameter greater than about 120 angstroms. This differs from traditional supports that have an average pore diameter of less than 80 angstroms.

Any suitable material can be used as a support material in the disclosed process. Typical materials for use in GTL processes include but are not limited to metal oxides such as alumina, silica, zirconia, zeolite/aluminosilicate materials, magnesium or a combination of these materials. In some embodiments, alumina may perform better as a support material to make a supported catalyst.

Under the disclosed embodiments, catalytically active metals that are included with or dispersed to the support material include substances that promote the production of diesel fuel. For example, these metals may include cobalt, iron, nickel or combinations thereof. Various promoters may be also added to the support material (e.g., ruthenium, palladium, platinum, gold, nickel, rhenium, iridium, silver, osmium, lanthanum, cerium, rhodium and combinations thereof).

Under the disclosed embodiments, the catalyst support might have a crush strength of between 3 lbs./mm and 4.5 lbs./mm and a BET surface area of greater than 150 $m^2/g$.

The active metal distribution on the support in the disclosed embodiments is between about 2% and about 10%. In at least one embodiment, the active metal distribution is about 4%. The active metal dispersion is the fraction of the atoms on the catalyst surface that are exposed as expressed by $D=N_S/N_T$, where D is the dispersion, $N_S$ is the number of surface atoms and $N_T$ is the total number of atoms of the material. Dispersion increases with decreasing crystallite size.

In one embodiment, a supported catalyst includes cobalt, iron or nickel deposited at between 5 weight percent and 30 weight percent on gamma alumina, more typically about 20 weight percent on gamma alumina, based on the total weight of the supported catalyst. Also the supported catalyst formulation includes selected combinations of one or more promoters consisting of ruthenium, palladium, platinum, gold, nickel, rhenium and combinations in about 0.01 to 2.0 weight percent range, more typically in about 0.1 to 0.5 weight percent range per promoter. Production methods of the catalyst include impregnation and other methods of production commonly used in the industry.

GTL supported catalysts are generally used in either fixed bed or slurry bed reactors. In a fixed bed reactor, the supported catalysts are packed within tubes or may be spread across a tray or packed into a number of channels or any other fixed bed reactor design whereby the reaction gas is evenly distributed and flows over the catalyst in the bed. In some embodiments, the catalyst is loaded in a multi-tubular fixed bed reactor, with each tube with an approximate one-inch diameter. In some embodiments, the catalyst is reduced in-situ in the multi-tubular fixed bed reactor at temperatures approximately below 650° F. Typical GTL catalysts are reduced ex-situ (before loading into the reactor) and at elevated temperatures that can be as high as 400° C. (750° F.). The use of an in-situ reduction procedure is part of at least one embodiment of the disclosure.

The operating parameters of the supported catalyst are selected to achieve the desired selectivity of diesel fuel. The reaction in some embodiments of the disclosures is typically kept at pressures below 400 psi, preferably at around 300 psi. These reactions operate at temperatures between about 350° F. and 460° F., more typically around 415° F.

Nonlimiting Examples of GTL Supported Catalysts

The following are nonlimiting examples of GTL supported catalysts:

1. Catalyst: Cobalt (5 weight percent to 30 weight percent on support). Promoter: Platinum or Gold (0.1 weight percent to 0.5 weight percent on support). Support: zeolite. Catalyst Shape: extradite. Pellet Radius: less than 300 microns. Mean Pore Diameter: greater than 80 Angstroms. Crush Strength: between 3 lbs/mm and 5 lbs/mm. BET Surface Area: greater than 100 $m^2/g$. Supported catalyst loaded in fixed bed reactor. Catalyst capable of producing diesel fuel to wax ratio greater than 9:1.

2. Catalyst: Cobalt (5 weight percent to 30 weight percent on support). Promoter: Ruthenium or Palladium (0.1 weight percent to 0.5 weight percent on support). Support: alumina or silica. Catalyst Shape: lobed. Pellet Radius: less than 300 microns. Mean Pore Diameter: greater than 100 Angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

3. Catalyst: Iron (5 weight percent to 30 weight percent on support). Promoter: Cobalt or Rhenium (0.1 weight percent to 0.5 weight percent on support). Support: alumina or silica. Catalyst Shape: lobed. Pellet Radius: less than 300 microns. Mean Pore Diameter: greater than 100 angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

4. Catalyst: Cobalt (20 weight percent to 25 weight percent on support). Promoter: Ruthenium or Palladium (0.1 weight percent to 0.5 weight percent on support). Support: zeolite or carbon nanotube. Catalyst Shape: extradite. Pellet Radius: less than 300 microns. Mean Pore Diameter: greater than 100 angstroms. Crush Strength: between 1.5 lbs/mm and 4 lbs/mm. BET Surface Area: greater than 100 $m^2/g$. Supported catalyst loaded in fixed bed reactor. Catalyst capable of producing diesel fuel to wax ratio greater than 9:1.

5. Catalyst: Cobalt (20 weight percent to 25 weight percent on support). Promoter: Platinum or Gold (0.1 weight percent to 0.5 weight percent on support). Support: alumina or silica. Catalyst Shape: lobed. Pellet Radius: less than 300 microns. Mean Pore Diameter: greater than 80 angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

6. Catalyst: Cobalt (20 weight percent to 25 weight percent on support). Promoter: Nickel or Rhenium (0.1 weight percent to 0.5 weight percent on support). Support: alumina or silica. Catalyst Shape: lobed. Pellet Radius: less than 300 microns. Mean Pore Diameter: greater than 80 Angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

7. Catalyst: Cobalt (20 weight percent to 25 weight percent on support). Promoter: Ruthenium or Palladium (0.1 weight percent to 0.5 weight percent on support). Support: alumina. Catalyst Shape: lobed. Pellet Radius: between 200 microns and 300 microns. Mean Pore Diameter: between 100 Angstroms and 200 Angstroms. Crush Strength: between 3 lbs/mm and 4.5 lbs/mm. BET Surface Area: between 100 $m^2/g$ and 200 $m^2/g$. Supported catalyst loaded in fixed bed reactor. Catalyst capable of producing diesel fuel to wax ratio greater than 95:5.

8. Catalyst: Iron/Cobalt Blend (20 weight percent to 25 weight percent on support). Promoter: Platinum or Gold (0.1 weight percent to 0.5 weight percent on support). Support: alumina. Catalyst Shape: lobed. Pellet Radius: between 200 microns and 300 microns. Mean Pore Diameter: between 100 Angstroms and 200 Angstroms. Crush Strength: between 3 lbs/mm and 4.5 lbs/mm. BET Surface Area: between 100 $m^2/g$ and 200 $m^2/g$. Supported catalyst loaded in fixed bed reactor. Catalyst capable of producing diesel fuel to wax ratio greater than 95:5.

9. Catalyst: Cobalt (20 weight percent to 25 weight percent on support). Promoter: Nickel or Rhenium (0.1 weight percent to 0.5 weight percent on support). Support: alumina. Catalyst Shape: lobed. Pellet Radius: between 200 microns and 300 microns. Mean Pore Diameter: between 100 Angstroms and 200 Angstroms. Crush Strength: between 3 lbs/mm and 4.5 lbs/mm. BET Surface Area: between 100 $m^2/g$ and 200 $m^2/g$. Supported catalyst loaded in fixed bed reactor. Catalyst capable of producing diesel fuel to wax ratio greater than 95:5.

10. Catalyst: Cobalt (approximately 22 weight percent on support). Promoter: Palladium. Support: gamma alumina. Catalyst Shape: tri-lobed. Pellet Radius: approximately 250 microns. Mean Pore Diameter: approximately 130 Angstroms. Crush Strength: approximately 4 lbs/mm. BET Surface Area: approximately 120 $m^2/g$. Supported catalyst loaded in multi-tubular fixed reactor of a tube in shell design. Catalyst capable of producing diesel fuel to wax ratio of approximately 96:4.

11. Catalyst: Iron (5 weight percent to 30 weight percent on support). Promoter: Ruthenium or Palladium (0.1 weight percent to 0.5 weight percent on support). Support: alumina or silica. Catalyst Shape: lobed. Pellet Radius: less than 300 microns. Mean Pore Diameter: greater than 100 Angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

12. Catalyst: Iron (5 weight percent to 30 weight percent on support). Promoter: Platinum or Gold (0.1 weight percent to 0.5 weight percent on support). Support: alumina or silica. Catalyst Shape: lobed. Pellet Radius: less than 300 microns. Mean Pore Diameter: greater than 100 angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

13. Catalyst: Iron (5 weight percent to 30 weight percent on support). Promoter: Nickel or Rhenium (0.1 weight percent to 0.5 weight percent on support). Support: alumina or silica. Catalyst Shape: lobed. Pellet Radius: less than 300 microns. Mean Pore Diameter: greater than 100 Angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

14. Catalyst: Iron (20 weight percent to 25 weight percent on support). Promoter: Ruthenium or Palladium (0.1 weight percent to 0.5 weight percent on support). Support: alumina or silica. Catalyst Shape: lobed. Pellet Radius: less than 300 microns. Mean Pore Diameter: greater than 100 Angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

15. Catalyst: Iron (20 weight percent to 25 weight percent on support). Promoter: Platinum or Gold (0.1 weight percent to 0.5 weight percent on support). Support: alumina or silica. Catalyst Shape: lobed. Pellet Radius: less than 300 microns. Mean Pore Diameter: greater than 100 Angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

16. Catalyst: Iron (20 weight percent to 25 weight percent on support). Promoter: Nickel or Rhenium (0.1 weight percent to 0.5 weight percent on support). Support: alumina or silica. Catalyst Shape: lobed. Pellet Radius: less than 300 microns. Mean Pore Diameter: greater than 100 Angstroms. Crush Strength: between 3 lbs/mm and 4.5 lbs/mm. BET Surface Area: greater than 100 $m^2/g$. Supported catalyst loaded in fixed bed reactor. Catalyst capable of producing diesel fuel to wax ratio greater than 9:1.

17. Catalyst: Iron (20 weight percent to 25 weight percent on support). Promoter: Ruthenium or Palladium (0.1 weight percent to 0.5 weight percent on support). Support: alumina. Catalyst Shape: lobed. Pellet Radius: between 200 microns and 300 microns. Mean Pore Diameter: between 100 Angstroms and 200 Angstroms. Crush Strength: between 3 lbs/mm and 4.5 lbs/mm. BET Surface Area: between 100 $m^2/g$ and 200 $m^2/g$. Supported catalyst loaded in fixed bed reactor. Catalyst capable of producing diesel fuel to wax ratio greater than 95:5.

18. Catalyst: Iron (20 weight percent to 25 weight percent on support). Promoter: Platinum or Gold (0.1 weight percent to 0.5 weight percent on support). Support: alumina. Catalyst Shape: lobed. Pellet Radius: between 200 microns and 300 microns. Mean Pore Diameter: between 100 Angstroms and 200 Angstroms. Crush Strength: between 3 lbs/mm and 4.5 lbs/mm. BET Surface Area: between 100 $m^2/g$ and 200 $m^2/g$. Supported catalyst loaded in fixed bed reactor. Catalyst capable of producing diesel fuel to wax ratio greater than 95:5.

19. Catalyst: Iron (20 weight percent to 25 weight percent on support). Promoter: Nickel or Rhenium (0.1 weight percent to 0.5 weight percent on support). Support: alumina. Catalyst Shape: lobed. Pellet Radius: between 200 microns and 300 microns. Mean Pore Diameter: between 100 Angstroms and 200 Angstroms. Crush Strength: between 3 lbs/mm and 4.5 lbs/mm. BET Surface Area: between 100 $m^2/g$ and 200 $m^2/g$. Supported catalyst loaded in fixed bed reactor. Catalyst capable of producing diesel fuel to wax ratio greater than 95:5.

20. Catalyst: Iron (approximately 22 weight percent on support). Promoter: Palladium. Support: gamma alumina. Catalyst Shape: tri-lobed. Pellet Radius: approximately 250 microns. Mean Pore Diameter: approximately 130 Angstroms. Crush Strength: approximately 4 lbs/mm. BET Surface Area: approximately 120 $m^2/g$. Supported catalyst loaded in multi-tubular fixed reactor of a tube in shell design. Catalyst capable of producing diesel fuel to wax ratio of approximately 96:4.

Example

Supported catalysts are prepared using an incipient wetness procedure whereby cobalt and promoter metals are impregnated on a gamma alumina, tri-lobed support with a mean effective pellet radius of 0.25 mm and a mean pore diameter of 130 Angstroms. The surface area of the catalyst is 120 $m^2/g$ as measured by $BET/N_2$ physisorption technique. The crush strength of the catalyst is approximately 4 lbs./mm. Drying and calcination steps are used in the production process to produce a catalyst with 22 wt % cobalt and 0.3 wt % promoter. Following the production of the supported catalysts, the supported catalysts are loaded in a multi-tubular fixed bed reactor of a tube in shell design with 1" (2.54 cm) diameter tubes. The catalyst is reduced with hydrogen at 75 psig and at a temperature less than 650° F. which are operating conditions that can be achieved in a fixed bed reactor that can be manufactured inexpensively.

In an alternative embodiment, the catalyst is reduced with a syngas feed with a high $H_2/CO$ ratio under the same conditions. Reduction with syngas (instead of $H_2$) reduces commercial operating costs, especially in remote areas where smaller, distributed plants are sited. While in-situ reduction is highlighted in this example, other reduction procedures, including ex-situ options, can be used.

Following reduction, the supported catalysts are contacted with syngas with $H_2$ and CO at a ratio of 2.05:1.0 ($H_2$:CO), at a pressure of 400 psi and at a temperature of 410° F.

Following the catalytic conversion step, the diesel fuel fraction and the wax and water fraction are separated out from the light hydrocarbon gases and unreacted CO and $H_2$ in knock out vessels at temperatures below 70° F. The separated liquid product fraction includes a diesel fuel fraction on top of a water fraction. A separator vessel with an internal vane is used to separate the diesel fuel fraction from the water. The wax is processed to extract an additional diesel fuel fraction that was entrained in the wax during collection.

The catalyst system under these operating conditions produces a diesel fuel to wax ratio of 96% diesel versus 4% wax. In the preferred embodiment described herein, the product is a diesel fuel or diesel type fuel blendstock consisting of a majority diesel fuel range hydrocarbons and a minimal amount of wax whereby the wax produced is a light wax produced from this process that is unique in that the hydrocarbons contained in the wax consist of no greater than 0.5 wt. % of each carbon number greater than C35 (for example, each carbon number C35, C36, etc. each consist of no greater than 0.5% wt. %).

The diesel fuel can be ideally used as a diesel fuel blendstock providing a petroleum derived diesel fuel with an improvement in cetane, reduction in sulfur, improved lubricity, reduced engine emissions and in some cases (based on the method of syngas production) can be used as a low carbon blendstock.

The wax is recycled back to the syngas production process and is used as an input to create additional syngas, thus improving overall conversion efficiencies of the integrated system.

The foregoing disclosures of embodiments have been presented only for purposes of illustration and description. They are not intended to be exhaustive or to limit the disclosures. Accordingly, many modifications and variations will be apparent to practitioners skilled in the art. Additionally, the above disclosure is not intended to limit the embodiments.

All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for."

The term "comprises" and grammatical equivalents thereof are used herein to mean that other components, ingredients, steps, etc. are optionally present. For example, an article "comprising" (or "which comprises") components A, B and C can consist of (i.e., contain only) components A, B and C, or can contain not only components A, B and C but also one or more other components.

The scope of the application is defined by the appended claims.

What is claimed is:

1. A process for the production of a hydrocarbon mixture comprising: a syngas production system receiving a primary feedstock and a secondary feedstock, wherein the primary feedstock comprises natural gas and the secondary feedstock comprises a wax by-product, wherein the syngas production system is a partial oxidation system;

producing an intermediary feed gas from the syngas production system;

inputting the intermediary feed gas to a catalytic reactor, wherein the catalytic reactor comprises a supported catalyst, and wherein the supported catalyst comprises cobalt, iron, nickel, or mixtures thereof deposited between 5 weight percent and 30 weight percent based on the total weight of the supported catalyst on a metal oxide and one or more promoters selected from the group consisting of rhenium, palladium, platinum, gold, nickel, and combinations thereof in a weight percent range of about 0.01 to 2.0 based on the total weight of the supported catalyst; and producing a hydrocarbon product stream wherein the hydrocarbon product stream comprises diesel fuel and a non-diesel fuel hydrocarbon by-product comprising wax, wherein the diesel fuel to wax ratio is greater than 9:1 by weight, wherein the process does not include a hydrocracking step, and wherein the wax is recycled and used as the secondary feedstock.

2. The process according to claim 1, wherein the partial oxidation system is catalytic.

3. The process according to claim 1, wherein the partial oxidation system is non-catalytic.

4. The process according to claim 2, wherein the primary feedstock is combined with an oxidant, and wherein the oxidant is pure oxygen, enriched air, or natural air.

5. The process according to claim 3, wherein the primary feedstock is combined with an oxidant, and wherein the oxidant is pure oxygen, enriched air, or natural air.

6. The process according to claim 4, wherein the catalytic reactor produces the hydrocarbon product stream at an operating pressure below 450 psi and an operating temperature between 350° F. and 460° F.

7. The process according to claim 5, wherein the catalytic reactor produces the hydrocarbon product stream at an operating pressure below 450 psi and an operating temperature between 350° F. and 460° F.

8. The process according to claim 6, wherein the diesel fuel has a cetane value greater than 65 and a lubricity value ranging from 200 microns to 475 microns.

9. The process according to claim 7, wherein the diesel fuel has a cetane value greater than 65 and a lubricity value ranging from 200 microns to 475 microns.

10. A process for the production of a hydrocarbon mixture comprising: a syngas production system receiving a primary feedstock and a secondary feedstock, wherein the primary feedstock comprises natural gas and the secondary feedstock comprises a wax by-product, wherein the syngas production system is a partial oxidation system;
   producing an intermediary feed gas from the syngas production system;
   inputting the intermediary feed gas to a catalytic reactor, wherein the catalytic reactor comprises a supported catalyst, and wherein the supported catalyst comprises cobalt, iron, nickel, or mixtures thereof deposited between 5 weight percent and 30 weight percent based on the total weight of the supported catalyst on a metal oxide and one or more promoters selected from the group consisting of ruthenium, palladium, platinum, gold, nickel, and combinations thereof in a weight percent range of about 0.01 to 2.0 based on the total weight of the supported catalyst, and wherein the catalytic reactor is included in a distributed plant producing less than 25,000 barrels of diesel fuel per day; and
   producing a hydrocarbon product stream wherein the hydrocarbon product stream comprises diesel fuel and a non-diesel fuel hydrocarbon by-product comprising wax, wherein the diesel fuel to wax ratio is greater than 9:1 by weight, wherein the process does not include a hydrocracking step, and wherein the wax is recycled and used as the secondary feedstock.

11. The process according to claim 10, wherein the partial oxidation system is catalytic.

12. The process according to claim 10, wherein the partial oxidation system is non-catalytic.

13. The process according to claim 11, wherein the primary feedstock is combined with an oxidant, and wherein the oxidant is pure oxygen or enriched air.

14. The process according to claim 11, wherein the primary feedstock is combined with an oxidant, and wherein the oxidant is natural air.

15. The process according to claim 12, wherein the primary feedstock is combined with an oxidant, and wherein the oxidant is pure oxygen or enriched air.

16. The process according to claim 12, wherein the primary feedstock is combined with an oxidant, and wherein the oxidant is natural air.

17. The process according to claim 13, wherein the distributed plant is at a shale gas location.

18. The process according to claim 15, wherein the distributed plant is at a shale gas location.

* * * * *